US008925092B1

(12) United States Patent
Johansson et al.

(10) Patent No.: US 8,925,092 B1
(45) Date of Patent: Dec. 30, 2014

(54) RISK ASSESSMENT FOR SOFTWARE APPLICATIONS

(75) Inventors: Jesper M. Johansson, Redmond, WA (US); Kenneth L. Hamer, Seattle, WA (US); Beau J. Hunter, Shoreline, WA (US); Jeffrey Joseph Busch, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 57 days.

(21) Appl. No.: 13/414,929

(22) Filed: Mar. 8, 2012

(51) Int. Cl.
H04L 29/06 (2006.01)
G06F 21/57 (2013.01)

(52) U.S. Cl.
CPC .......... *H04L 63/1433* (2013.01); *G06F 21/577* (2013.01)
USPC .......................................................... 726/25

(58) Field of Classification Search
CPC .................................................... G06F 21/577
USPC ............................................................ 726/25
See application file for complete search history.

(56) References Cited

U.S. PATENT DOCUMENTS

| 7,536,724 | B1* | 5/2009 | Sobel et al. ..................... 726/25 |
| 7,752,125 | B1* | 7/2010 | Kothari et al. ................... 705/38 |
| 2003/0233438 | A1* | 12/2003 | Hutchinson et al. .......... 709/223 |
| 2006/0031679 | A1* | 2/2006 | Soltis et al. ..................... 713/182 |
| 2008/0209567 | A1* | 8/2008 | Lockhart et al. ................. 726/25 |
| 2009/0119501 | A1* | 5/2009 | Petersen ........................ 713/100 |
| 2010/0095235 | A1* | 4/2010 | Bennett et al. ................. 715/781 |
| 2011/0047620 | A1* | 2/2011 | Mahaffey et al. ............... 726/23 |
| 2012/0304300 | A1* | 11/2012 | LaBumbard .................... 726/25 |
| 2013/0097709 | A1* | 4/2013 | Basavapatna et al. .......... 726/25 |
| 2013/0111592 | A1* | 5/2013 | Zhu et al. ......................... 726/25 |
| 2013/0179833 | A1* | 7/2013 | Stallings et al. ............... 715/810 |

* cited by examiner

*Primary Examiner* — Jeffery Williams
*Assistant Examiner* — Christopher C Harris
(74) *Attorney, Agent, or Firm* — Thomas | Horstemeyer, LLP

(57) ABSTRACT

Disclosed are various embodiments for assessing risk associated with different software applications which are installed on user computing devices in an enterprise networked environment. Ratings are generated for the different software applications based at least in part on respective characteristics of the different software applications. Risk profiles are generated for the installations of the different software applications on the user computing devices in the networked environment. The risk profiles are generated based at least in part on the respective ratings, the respective user computing devices, and the respective end users associated with the respective user computing devices.

23 Claims, 7 Drawing Sheets

RISK ASSESSMENT FOR SOFTWARE APPLICATIONS

BACKGROUND

Network security is of paramount concern for enterprise computing environments. Security vulnerabilities in software are continually discovered, and software updates to correct the vulnerabilities are regularly distributed. Further, harmful software such as viruses, malware, adware, and so on may be inadvertently installed by users. For network security, software updates should be regularly applied, installation of harmful software should be prevented, and previously installed harmful software should be removed.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to risk assessment for users and computing devices in enterprise networks of computing resources. System administrators are tasked with ensuring that the enterprise is not exposed to excess liability due to malicious, unpatched, or otherwise vulnerable software in use by end users of computing devices. In a typical large-scale enterprise environment, this task may be performed through the use of aggressive lock down mechanisms, limiting user privileges, and tightly controlling software that is installed on each computing device. This may pose challenges where end users require administrative rights to their computing devices, where end users attach their own computing devices to the network, and in other situations where it is deemed that aggressive management policies may be detrimental to the end-user experience or productivity.

Various embodiments of the present disclosure automate risk assessment and compliance reporting by creating a risk profile for each computing device on which a given software application is installed. This may be especially useful for enterprise networks where some or all users have access to install applications on their respective computing devices. Information for this risk assessment may be aggregated from many systems to determine the overall threat prospect for a given software application. Risk is assessed with respect to different users who may be given different levels of access. Risk is also assessed with respect to different computing devices, which may be used to perform tasks having different security concerns. In the following discussion, a general description of the system and its components is provided, followed by a discussion of the operation of the same.

Figure 1:
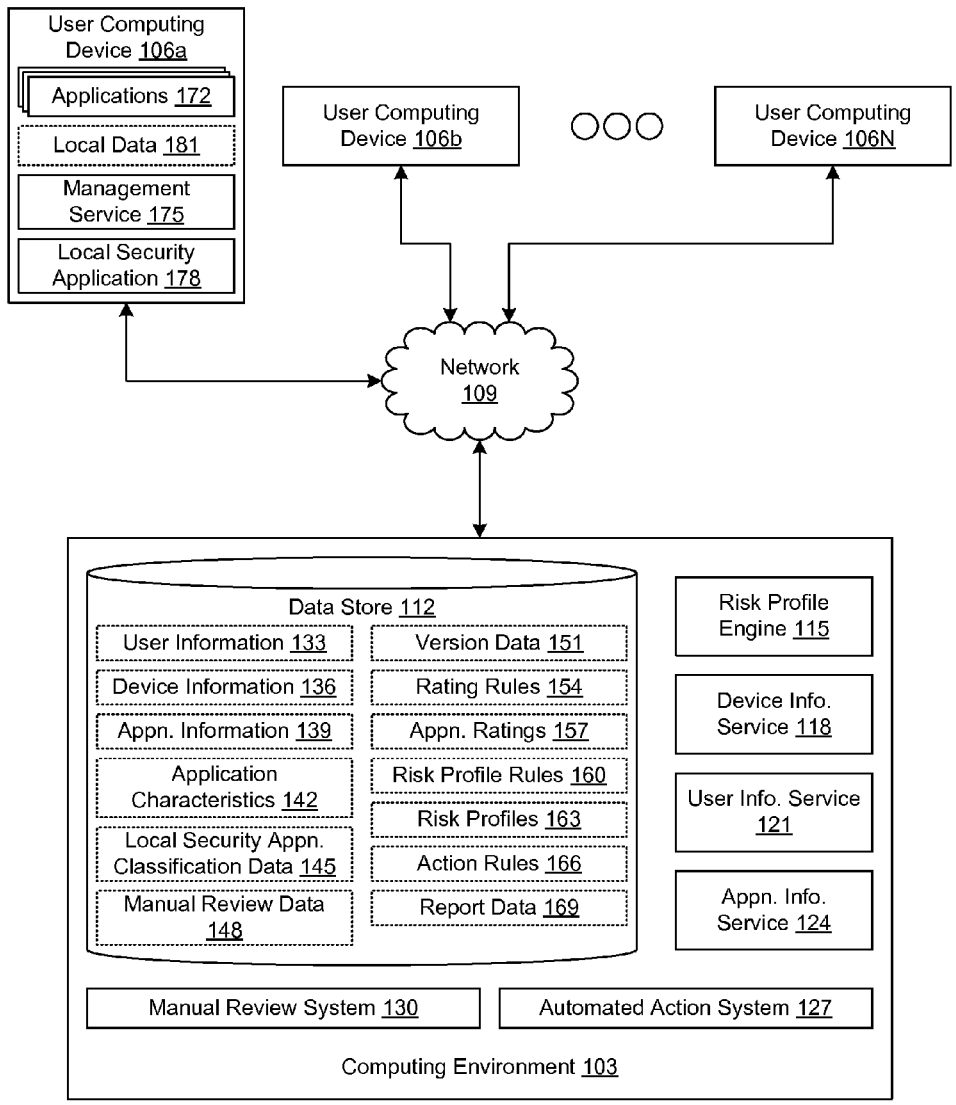
FIG. 1 is a drawing of a networked environment according to various embodiments of the present disclosure.

With reference to FIG. 1, shown is a networked environment 100 according to various embodiments. The networked environment 100 includes a computing environment 103 in data communication with a plurality of user computing devices 106 by way of a network 109. The network 109 includes, for example, the Internet, intranets, extranets, wide area networks (WANs), local area networks (LANs), wired networks, wireless networks, or other suitable networks, etc., or any combination of two or more such networks. In one example, the networked environment 100 corresponds to an internal network of computing devices operated by an enterprise entity.

The computing environment 103 may comprise, for example, a server computer or any other system providing computing capability. A plurality of computing devices may be employed in the computing environment 103 that are arranged, for example, in one or more server banks or computer banks or other arrangements. For example, a plurality of computing devices together may comprise a cloud computing resource, a grid computing resource, and/or any other distributed computing arrangement. Such computing devices may be located in a single installation or may be distributed among many different geographical locations.

Various applications and/or other functionality may be executed in the computing environment 103 according to various embodiments. Also, various data is stored in a data store 112 that is accessible to the computing environment 103. The data store 112 may be representative of a plurality of data stores 112 as can be appreciated. The data stored in the data store 112, for example, is associated with the operation of the various applications and/or functional entities described below.

The components executed on the computing environment 103, for example, include a risk profile engine 115, a device information service 118, a user information service 121, an application information service 124, an automated action system 127, a manual review system 130, and other applications, services, processes, systems, engines, or functionality not discussed in detail herein. The risk profile engine 115 is executed to generate a risk profile for each installation of a software application in the user computing devices 106 of the networked environment 100. The risk profile is generated based at least in part on a core rating of the software application, information about the user computing device 106 on which it is installed, information about one or more end users of the user computing device 106, and/or other information. In response to the risk profile meeting one or more predefined criteria, the risk profile engine 115 may cause one or more actions to be performed.

The device information service 118 is executed to obtain information about the various user computing devices 106 in the networked environment 100. Such information may include, but is not limited to, whether the user computing device 106 stores protected information (e.g., personally identifiable information, payment instrument information, security credentials, etc.), whether the user computing device 106 stores and persists local data, the physical location of the user computing device 106, the logical location of the user computing device 106 in the networked environment 100, whether the user computing device 106 hosts other unmanaged applications, and/or other information. Such information may be described as indicating a relationship of the user computing device 106 to the networked environment 100.

The user information service 121 is executed to obtain information about various end users of the user computing devices 106. Such information may include, but is not limited to, the job functions of the user, the access levels and privileges of the user, an overall risk compliance rating for the user, the background information for the user, and/or other information. Such information may be described as indicating a relationship of the user to the enterprise entity associated with the networked environment 100.

The application information service 124 is executed to obtain information about characteristics of the software applications which are installed in the user computing devices 106 of the networked environment 100. Such characteristics may include, but is not limited to, whether the application communicates over the network 109, whether the application uses escalated privileges, whether the application accesses protected or sensitive data resources, whether the application uses virtualization protections, whether the application uses mandatory access control requirements, whether the application is flagged as malicious by anti-virus software, the number of installations of the application across the user computing devices 106, whether the application corresponds to a latest known version, whether the application is significantly out of date (e.g., the difference between the version of the application and the latest known version meets a predefined threshold), whether the application is an otherwise unknown application that is quickly propagating throughout the user computing devices 106, and/or other characteristics. The characteristics of the application may be employed by the risk profile engine 115 to generate a software application risk rating, or core rating, for the software application.

The automated action system 127 is executed to perform one or more actions in response to the risk profile of an application installation meeting one or more criteria. Such actions may include, but are not limited to, disabling or limiting logins to a user computing device 106, disabling or limiting login capability for a specific user or group of users, disabling or limiting the account of a user, suggesting employee termination of a user, disabling or limiting connectivity to the network 109 for a user computing device 106, initiating an uninstallation or removal of a software application from a user computing device 106, initiating an upgrade of a software application on a user computing device 106, displaying information to the end user informing them that a software application is out of date or otherwise out of compliance, displaying a dialog to the user requesting information regarding an unknown software application, and/or other actions.

The manual review system 130 is configured to submit a risk profile of an application installation for manual review. In one embodiment, the risk profile may be manually reviewed by a network administrator of the enterprise entity associated with the networked environment. In another embodiment, the risk profile may be reviewed by outside contractors who are compensated on a per-task basis. For example, the risk profile may be sent to a network site where various tasks are provided for completion by a group of outside contractors. The outside contractors can select tasks and perform the task in exchange for compensation. In some cases, the outside contractors may be prequalified by completing a certain number of tasks successfully, by earning recommendations of others, and/or by other approaches. The results of the outside contractors may be verified, for example, by having multiple outside contractors perform each task, or by having multiple outside contractors perform selected tasks for spot-checking reasons.

The data stored in the data store 112 includes, for example, user information 133, device information 136, application information 139, application characteristics 142, local security application classification data 145, manual review data 148, version data 151, rating rules 154, application ratings 157, risk profile rules 160, risk profiles 163, action rules 166, report data 169, and potentially other data. The user information 133 includes various information about the user that may be aggregated by the user information service 121. Such information may include data from human resources systems, lightweight directory access protocol (LDAP) servers, portable operating system interface (POSIX) user groups, and/or other user-related or employee-related data.

The device information 136 includes various information about the user computing devices 106 that may be aggregated by the device information service 118. Such information may include the types of data stored on a user computing device 106, the end users who have access to the user computing device 106, the applications which are installed on the user computing device 106, the physical and logical locations of the user computing device 106, and/or other data. The application information 139 includes various information about the software applications which are deployed on user computing devices 106. The application information 139 may include a list of all of the applications and the latest versions of each. By examining all of the applications installed on the user computing devices 106, it is possible to "crowd source" information such as a latest available version in order to identify out-of-date software.

The application characteristics 142 include various characteristics that are employed in generating application ratings 157. The application characteristics 142 may be determined from the application information 139, local security application classification data 145, and/or from other sources by the application information service 124. The local security application classification data 145 indicates whether a software application is flagged as being malicious by anti-virus software or other local security software. The manual review data 148 includes data relating to a manual review of a risk profile 163 by way of the manual review system 130. The manual review data 148 may indicate possible actions to be performed in response to the risk profile 163 based at least in part on the manual review.

The version data 151 may indicate the various versions of software applications which are installed on the user computing devices 106, including which version is determined to be the latest version. The rating rules 154 include rules that are used by the risk profile engine 115 in determining the application ratings 157. Such rules may include thresholds and/or other predefined criteria relative to the application characteristics 142 and other data. The application ratings 157 correspond to "core ratings" of the software applications according to the application characteristics 142 rather than the user computing device 106 or the end users associated with the user computing device 106.

The risk profile rules 160 include rules that are used by the risk profile engine 115 in determining the risk profiles 163. Such rules may include thresholds and/or other predefined criteria relative to the application ratings 157, the device information 136, the user information 133, and other data. The risk profiles 163 indicate a degree of security risk associated with a user-installed application on a user computing device 106. Various corrective actions may be undertaken in response to the risk profiles 163 indicating, for example, a certain type of risk, a risk having a certain magnitude, and so on. These actions may be determined by evaluation of action rules 166 which may indicate various thresholds or criteria for performing an action in response to a risk profile 163. The report data 169 includes various reports about risk profiles 163 and potential corrective actions for a networked environment 100.

The user computing devices 106a, 106b . . . 106N are representative of a plurality of client devices that may be coupled to the network 109. Each of the user computing devices 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. Each of the user computing devices 106 is associated with one or more end users that have login access. In one scenario, at least some of the end users have access to download and install software onto their user computing devices 106.

Each user computing device 106 may be configured to execute various applications 172, which may correspond to user-installed software applications. A management service 175 may be executed to perform various management functions for the user computing device 106, e.g., uninstall applications, display notifications, obtain input from users regarding self-installed unknown applications, and/or other management functions. A local security application 178, such as anti-virus software, may be present to scan the user computing device 106 for any potentially malicious software. Other software may be present in other embodiments. Various local data 181 may be stored on at least some of the user computing devices 106. In some cases, the user computing devices 106 may be mere terminals and not persist local data 181.

Next, a general description of the operation of the various components of the networked environment 100 is provided. To begin, the risk profile engine 115 gathers various forms of data to begin an examination of the user computing devices 106 in the networked environment 100. The examination may be performed in response to a request by a system administrator, periodically, or at some other time.

The device information service 118 gathers information and makes determinations regarding the risk conditions of the user computing devices 106 in the networked environment 100. The user information service 121 gathers information and makes determinations regarding the risk conditions of the end users of the user computing devices 106. The application information service 124 gathers various information and evaluates various application characteristics 142 of the applications 172 which are installed on the user computing devices 106.

The risk profile engine 115 generates an application rating 157 for each of the applications 172 according to the rating rules 154. The risk profile engine 115 then generates a risk profile 163 for each installation of each of the applications 172. Each risk profile 163 is generated using the risk profile rules 160 based at least in part on various factors including the application ratings 157, the device information 136 regarding the user computing device 106 on which the application 172 is installed, the user information 133 regarding the end users of the user computing device 106 on which the application 172 is installed, and/or other factors. The risk profile engine 115 may generate various reports in the report data 169 for manual review by the system administrators.

Also, the risk profile engine 115 may perform one or more actions in response to the risk profile 163 meeting a threshold or meeting predefined criteria as defined by the action rules 166. Such actions may be performed automatically by the automated action system 127. Alternatively, the risk profile 163 may be referred for further review to the manual review system 130.

Figure 2:
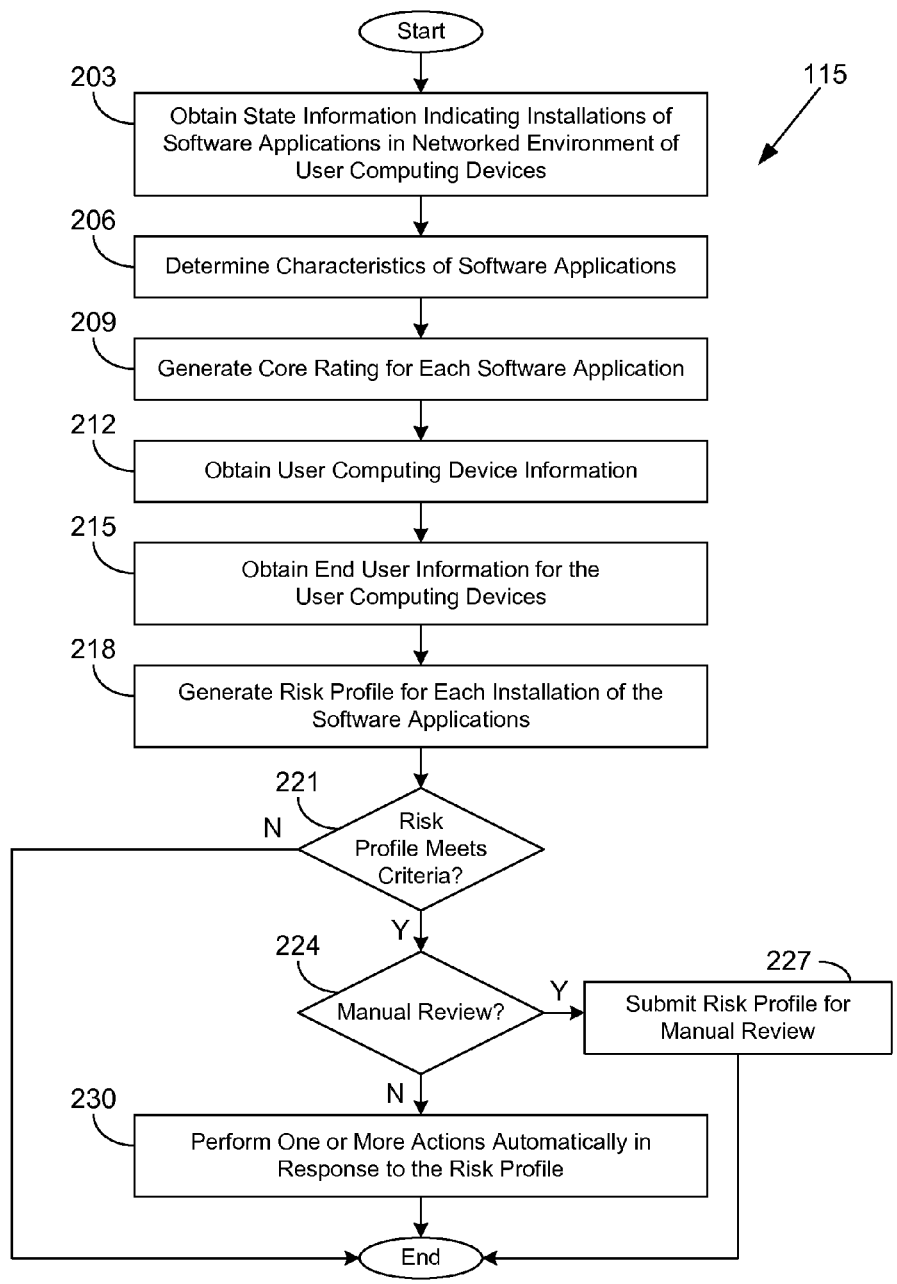
FIG. 2 is a flowchart illustrating one example of functionality implemented as portions of a risk profile engine executed in a computing environment in the networked environment of FIG. 1 according to various embodiments of the present disclosure.

Referring next to FIG. 2, shown is a flowchart that provides one example of the operation of a portion of the risk profile engine 115 according to various embodiments. It is understood that the flowchart of FIG. 2 provides merely an example of the many different types of functional arrangements that may be employed to implement the operation of the portion of the risk profile engine 115 as described herein. As an alternative, the flowchart of FIG. 2 may be viewed as depicting an example of steps of a method implemented in the computing environment 103 (FIG. 1) according to one or more embodiments.

Beginning with box 203, the risk profile engine 115 obtains state information indicating installations of software applications 172 (FIG. 1) in the networked environment 100 (FIG. 1) of user computing devices 106 (FIG. 1). The state information may correspond to the application information 139 (FIG. 1), the local security application classification data 145 (FIG. 1), version data 151 (FIG. 1), and/or other data. In box 206, the risk profile engine 115 obtains the application characteristics 142 (FIG. 1) for the applications 172 from the application information service 124 (FIG. 1). In box 209, the risk profile engine 115 generates the application ratings 157 (FIG. 1), or core ratings, for the applications 172.

In box 212, the risk profile engine 115 obtains device information 136 (FIG. 1) about the user computing devices 106 from the device information service 118 (FIG. 1). In box 215, the risk profile engine 115 obtains user information 133 (FIG. 1) about the end users of the user computing devices 106 from the user information service 121 (FIG. 1). In box 218, the risk profile engine 115 generates a risk profile 163 (FIG. 1) for each installation of the software applications 172. The risk profile engine 115 generates the risk profile 163 based at least in part on the application ratings 157, the device information 136 for the respective user computing devices 106, and the user information 133 for the end users of the respective user computing devices 106.

In box 221, for each risk profile 163, the risk profile engine 115 determines whether the risk profile 163 meets predetermined criteria for magnitude of risk or type of risk. If the risk profile 163 does not meet the predetermined criteria, the portion of the risk profile engine 115 ends. If the risk profile 163 does meet the predetermined criteria, the risk profile engine 115 moves to box 224 and determines whether the risk profile 163 is to be manually reviewed.

If the risk profile 163 is to be manually reviewed, the risk profile engine 115 moves to box 227 and submits the risk profile 163 to the manual review system 130 (FIG. 1) for manual review. Thereafter, the portion of the risk profile engine 115 ends. If the risk profile 163 is not to be manually reviewed, the risk profile engine 115 instead moves from box 224 to box 230 and performs one or more actions automatically by the automated action system 127 (FIG. 1) in response to the risk profile 163. Thereafter, the portion of the risk profile engine 115 ends.

Figure 3:
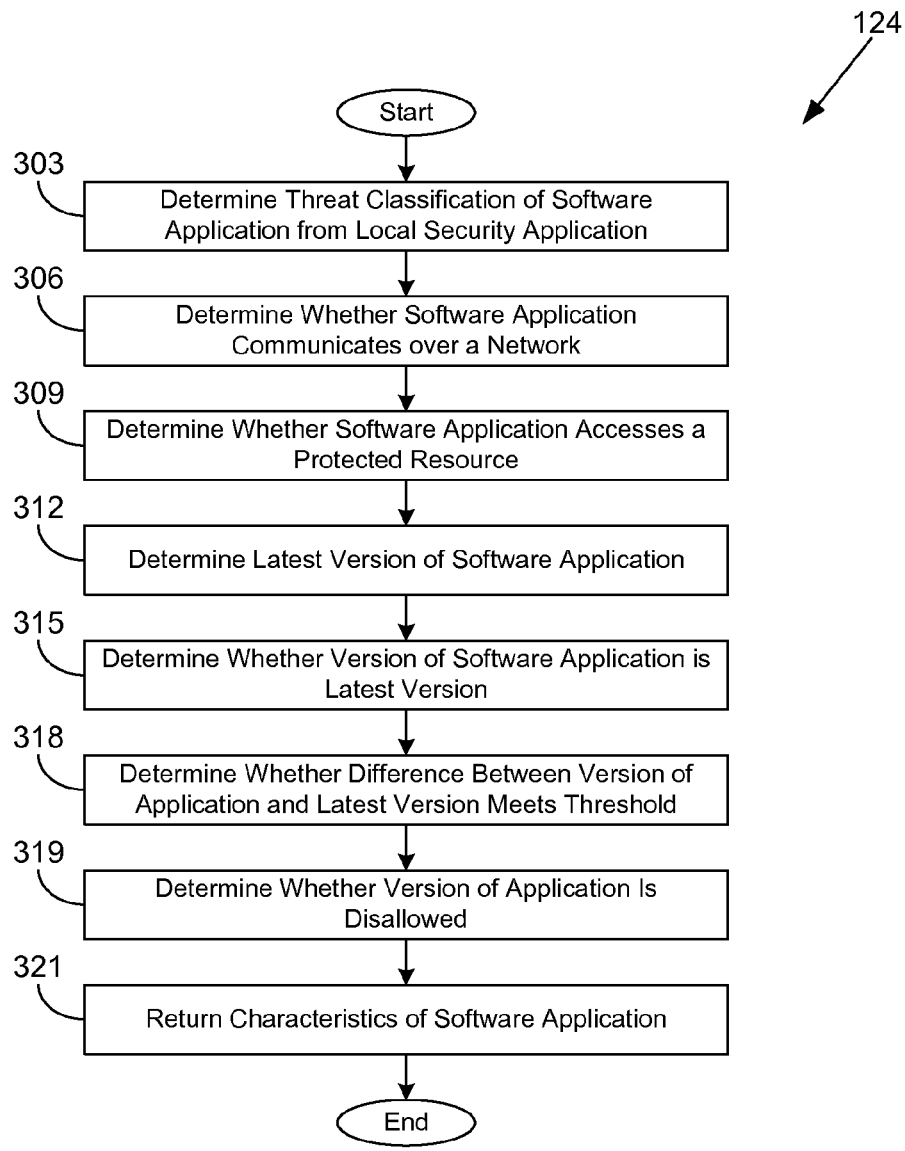
FIG. 3 is a flowchart illustrating one example of functionality implemented as portions of an application information service executed in a computing environment in the networked environment of FIG. 1 according to various embodiments of the present disclosure.

Turning now to FIG. 3, shown is a flowchart that provides one example of the operation of a portion of the application information service 124 according to various embodiments. It is understood that the flowchart of FIG. 3 provides merely an example of the many different types of functional arrangements that may be employed to implement the operation of the portion of the application information service 124 as described herein. As an alternative, the flowchart of FIG. 3 may be viewed as depicting an example of steps of a method implemented in the computing environment 103 (FIG. 1) according to one or more embodiments.

Beginning with box 303, the application information service 124 determines the threat classification of each software application 172 (FIG. 1) from the local security applications 178 (FIG. 1) executed on the user computing devices 106 (FIG. 1) and/or from another source of threat classifications. The risk profile 163 (FIG. 1) may indicate a high level of risk for an application 172 which is already classified as potentially malicious or a threat. The application information service 124 may also obtain information indicating whether the application 172 has a long history of security vulnerabilities, which may be a greater risk. In box 306, the application information service 124 determines whether the software application 172 communicates over a network 109 (FIG. 1). The risk profile 163 may indicate a greater level of risk for an application 172 that is network enabled versus one that is not.

In box 309, the application information service 124 determines whether the application 172 is configured to access a protected resource, e.g., personally identifying information, payment instrument data, passwords, and so on. The risk profile 163 may indicate a greater level of risk for an application 172 that accesses protected resources compared with one that does not access protected resources. In box 312, the application information service 124 determines the latest version of the software application 172 from the version data 151 (FIG. 1). The version data 151 may be populated by examining the installed versions of the application 172 in the networked environment 100.

In box 315, the application information service 124 determines whether the application 172 is a latest version. In box 318, the application information service 124 determines whether a difference between the version of the application 172 and the latest version meets a threshold. The risk profile 163 may indicate a greater risk for applications 172 that are out-of-date or not current. The application information service 124 may also aggregate information indicating the number of installations of this application 172 across the user computing devices 106, whether the application 172 is an otherwise unknown application that is quickly propagating throughout the user computing devices 106, and/or other information.

In box 319, the application information service 124 determines whether the version of the application 172 is disallowed. For example, the rating rules 154 (FIG. 1) may indicate that a particular version or versions of an application 172 (or all versions of the application 172) are disallowed on the user computing devices 106, leading to a relatively high risk profile 163 and/or automatic remedial action. In box 321, the application information service 124 returns the application characteristics 142 (FIG. 1) according to the determinations made in boxes 303-319. Thereafter, the portion of the application information service 124 ends.

Figure 4:
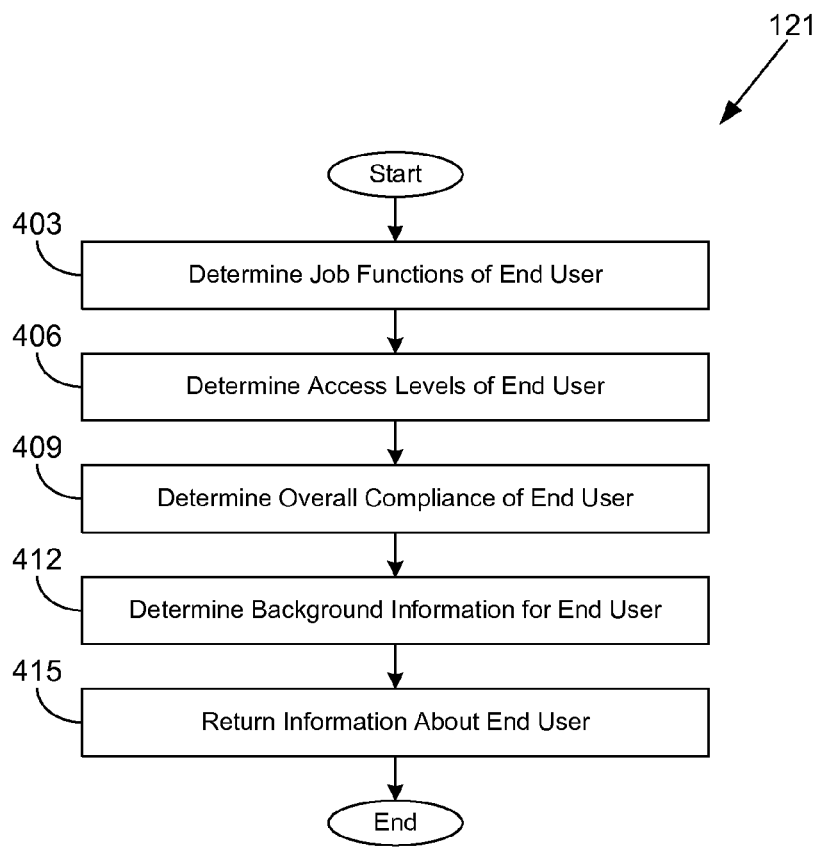
FIG. 4 is a flowchart illustrating one example of functionality implemented as portions of a user information service executed in a computing environment in the networked environment of FIG. 1 according to various embodiments of the present disclosure.

Continuing to FIG. 4, shown is a flowchart that provides one example of the operation of a portion of the user information service 121 according to various embodiments. It is understood that the flowchart of FIG. 4 provides merely an example of the many different types of functional arrangements that may be employed to implement the operation of the portion of the user information service 121 as described herein. As an alternative, the flowchart of FIG. 4 may be viewed as depicting an example of steps of a method implemented in the computing environment 103 (FIG. 1) according to one or more embodiments.

Beginning with box 403, the user information service 121 determines the job functions of the users. A risk profile 163 (FIG. 1) associated with an installation used by a relatively important user may indicate a relatively greater risk. More important users may, for example, be offered a higher service level by the networked environment 100, thus downtime may be required to be especially minimized. Also, a low-level employee logging into a relatively high level user computing device 106 (FIG. 1) may be associated with a relatively high risk. In box 406, the user information service 121 determines access levels associated with the end users. A risk profile 163 associated with a user having a relatively high level of access (e.g., domain administrators, etc.) may indicate a relatively greater risk.

In box 409, the user information service 121 determines an overall compliance for each end user. In other words, the user information service 121 determines whether the end user is prone to operate on user computing devices 106 associated with a relatively high risk profile 163. Risk profiles 163 associated with such an end user may indicate relatively high levels of risk. In box 412, the user information service 121 determines background information for the end user. To this end, the user information service 121 may perform a background check, a credit check, and/or obtain other data from an external provider. The user information service 121 may determine whether the end user is bonded, has a security clearance, or meets other risk-affecting criteria. The user information service 121 may also examine data from internal systems, such as, for example, data indicating employee performance and/or other data. It may be the case that a poor credit score or poor employee performance may be indicators of risk. In box 415, the user information service 121 returns the user information 133 (FIG. 1) according to the determinations made in box 403-412. Thereafter, the portion of the user information service 121 ends.

Figure 5:
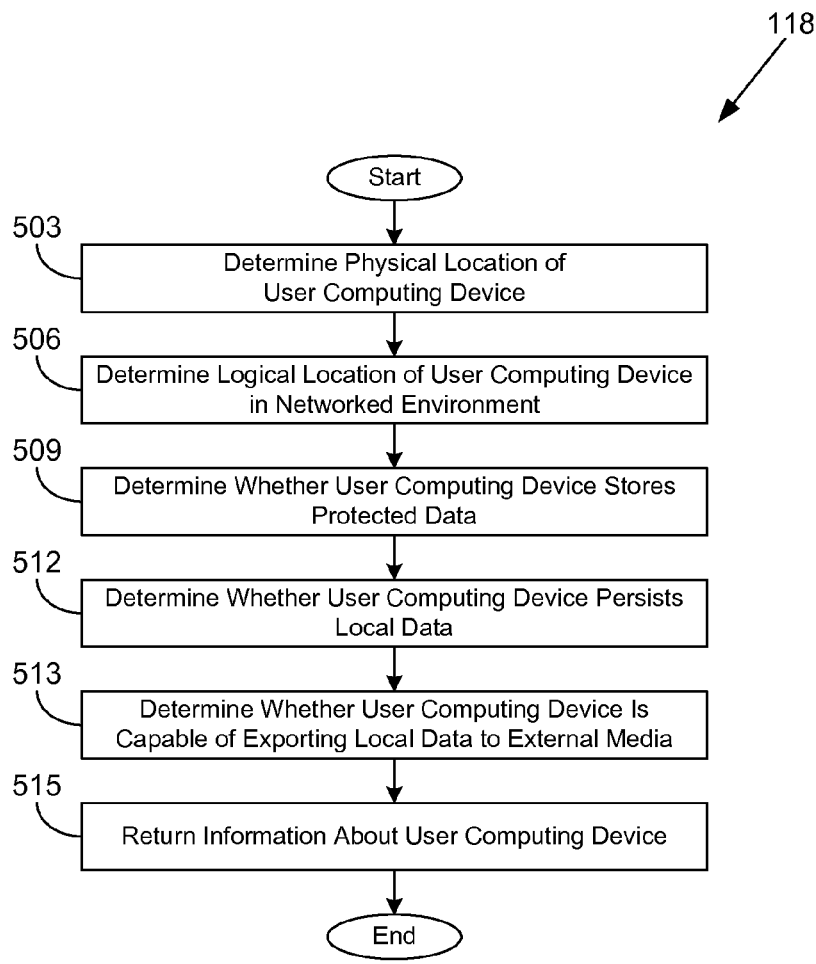
FIG. 5 is a flowchart illustrating one example of functionality implemented as portions of a device information service executed in a computing environment in the networked environment of FIG. 1 according to various embodiments of the present disclosure.

Moving on to FIG. 5, shown is a flowchart that provides one example of the operation of a portion of the device information service 118 according to various embodiments. It is understood that the flowchart of FIG. 5 provides merely an example of the many different types of functional arrangements that may be employed to implement the operation of the portion of the device information service 118 as described herein. As an alternative, the flowchart of FIG. 5 may be viewed as depicting an example of steps of a method implemented in the computing environment 103 (FIG. 1) according to one or more embodiments.

Beginning with box 503, the device information service 118 determines the physical location of the user computing device 106 (FIG. 1). For example, if a user computing device 106 is located in a foreign country, it may be associated with a greater level of risk. In box 506, the device information service 118 determines the logical location of the user computing device 106 in the networked environment 100 (FIG. 1). For example, a user computing device 106 in a secured location of the network 109 (e.g., behind a firewall, etc.) may be associated with a greater level of risk than a user computing device 106 accessing a public portion of the network 109.

In box 509, the device information service 118 determines whether the user computing device 106 stores protected data, e.g., personally identifiable information, payment instrument data, etc. For example, a user computing device 106 that stores protected data may be associated with a greater level of risk than one that does not. In box 512, the device information service 118 determines whether the user computing device 106 persists local data 181 (FIG. 1). For example, a user computing device 106 that persists local data 181 may be a greater risk than a user computing device 106 that is merely a terminal.

In box 513, the device information service 118 determines whether the user computing device 106 is capable of exporting local data 181 to external media. For example, the user computing device 106 may be connected to a printer, have an external storage drive, have open universal serial bus (USB) ports, and so on. Such a device may be associated with a greater level of risk than a user computing device 106 having no USB ports, restricted USB ports, and/or otherwise limited approaches to exporting local data 181 to external media. In box 515, the device information service 118 returns the user information 133 (FIG. 1) according to the determinations of boxes 503-512. Thereafter, the portion of the device information service 118 ends.

Figure 6:
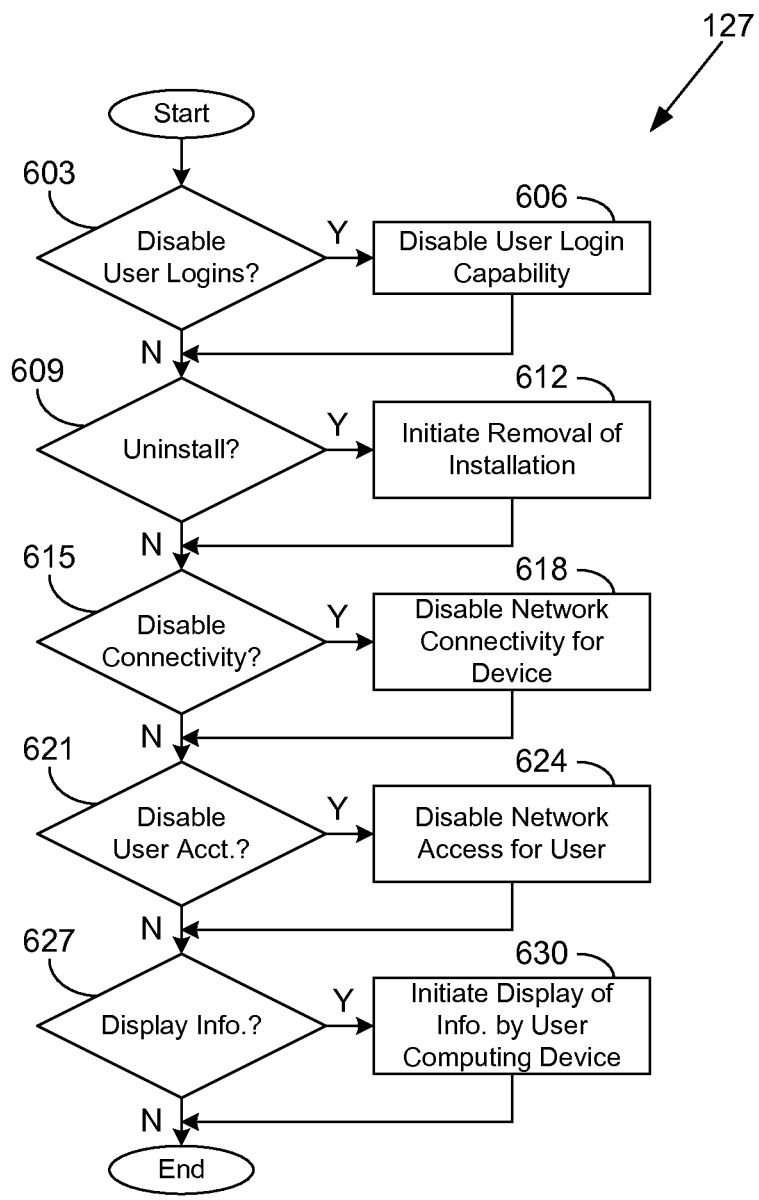
FIG. 6 is a flowchart illustrating one example of functionality implemented as portions of an automated action system executed in a computing environment in the networked environment of FIG. 1 according to various embodiments of the present disclosure.

Referring next to FIG. 6, shown is a flowchart that provides one example of the operation of a portion of the automated action system 127 according to various embodiments. It is understood that the flowchart of FIG. 6 provides merely an example of the many different types of functional arrangements that may be employed to implement the operation of the portion of the automated action system 127 as described herein. As an alternative, the flowchart of FIG. 6 may be viewed as depicting an example of steps of a method implemented in the computing environment 103 (FIG. 1) according to one or more embodiments.

Beginning with box 603, the automated action system 127 determines whether user logins to a user computing device 106 (FIG. 1) are to be disabled in response to a risk profile 163 (FIG. 1). If so, the automated action system 127 disables or limits a user login capability for the user computing device 106. In some cases, login may be permitted, but access to resources may be restricted. Also, some users may be restricted from logging into the user computing device 106 while others are not. The automated action system 127 continues to box 609. If user logins are not to be disabled, the automated action system 127 proceeds from box 603 to box 609.

In box 609, the automated action system 127 determines whether an application 172 (FIG. 1) is to be uninstalled. If so, the automated action system 127 forces an uninstallation or removal of the application 172 from the user computing device 106. The automated action system 127 continues to box 615. If an uninstallation is not to be performed, the automated action system 127 continues from box 609 to box 615.

In box 615, the automated action system 127 determines whether connectivity to the network 109 (FIG. 1) is to be disabled for the user computing device 106. If so, the automated action system 127 disables or limits network connectivity to the user computing device 106 in box 618. In some cases, the network connectivity may be not entirely disabled but rather limited, for example, to systems that provide software updates or patches. The automated action system 127 continues to box 621. If network connectivity is not to be disabled, the automated action system 127 proceeds from box 615 to box 621.

In box 621, the automated action system 127 determines whether a user account is to be disabled for the networked environment 100 (FIG. 1). If so, the automated action system 127 disables or limits network access for the user in box 624. In some cases, the automated action system 127 may recommend employee termination. The automated action system 127 continues to box 627. If the user account is not to be disabled, the automated action system 127 proceeds from box 621 to box 627.

In box 627, the automated action system 127 determines whether information is to be displayed to the user by the user computing device 106. If so, the automated action system 127 initiates a display of information to the user by the user computing device 106 in box 630. The user may be informed that the application 172 is out of date or is otherwise out of compliance. In some cases, a dialog may be displayed asking the user to identify and describe the function of unknown software. Thereafter, the portion of the automated action system 127 ends. If information is not to be displayed, the automated action system 127 also ends.

Figure 7:
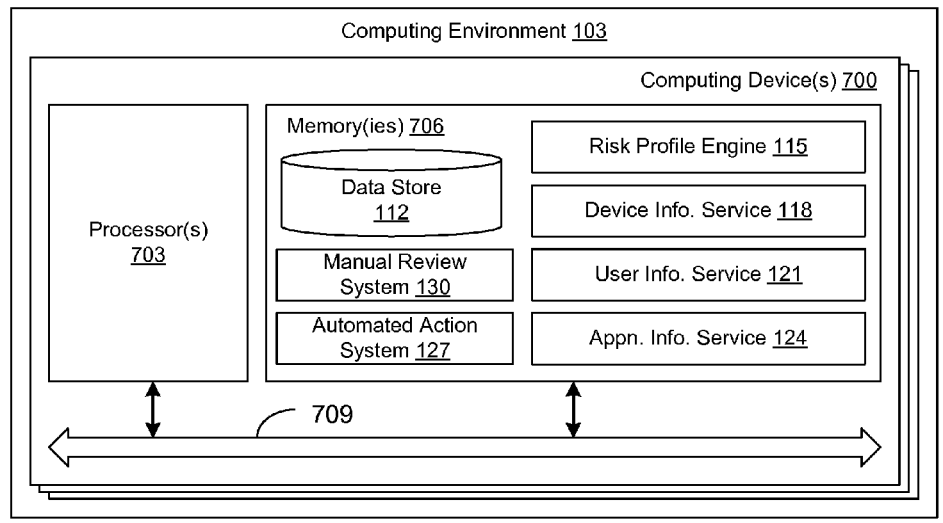
FIG. 7 is a schematic block diagram that provides one example illustration of a computing environment employed in the networked environment of FIG. 1 according to various embodiments of the present disclosure.

With reference to FIG. 7, shown is a schematic block diagram of the computing environment 103 according to an embodiment of the present disclosure. The computing environment 103 comprises one or more computing devices 700. Each computing device 700 includes at least one processor circuit, for example, having a processor 703 and a memory 706, both of which are coupled to a local interface 709. To this end, the computing device 700 may comprise, for example, at least one server computer or like device. The local interface 709 may comprise, for example, a data bus with an accompanying address/control bus or other bus structure as can be appreciated.

Stored in the memory 706 are both data and several components that are executable by the processor 703. In particular, stored in the memory 706 and executable by the processor 703 are the risk profile engine 115, the device information service 118, the user information service 121, the application information service 124, the automated action system 127, the manual review system 130, and potentially other applications. Also stored in the memory 706 may be a data store 112 and other data. In addition, an operating system may be stored in the memory 706 and executable by the processor 703.

Figure 8:
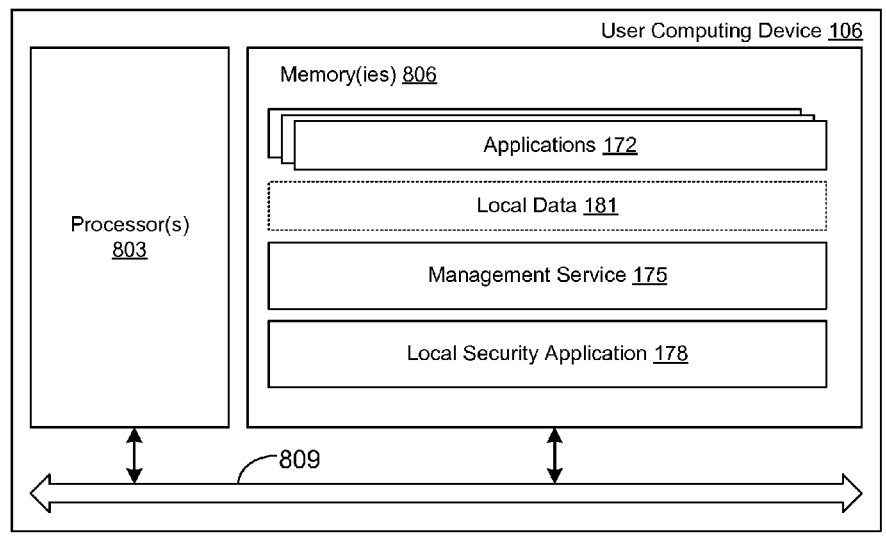
FIG. 8 is a schematic block diagram that provides one example illustration of a user computing device employed in the networked environment of FIG. 1 according to various embodiments of the present disclosure.

Turning now to FIG. 8, shown is a schematic block diagram of an example of the user computing device 106 according to an embodiment of the present disclosure. The user computing device 106 includes at least one processor circuit, for example, having a processor 803 and a memory 806, both of which are coupled to a local interface 809. To this end, the user computing device 106 may comprise, for example, at least one client computer or like device. The local interface 809 may comprise, for example, a data bus with an accompanying address/control bus or other bus structure as can be appreciated.

Stored in the memory 806 are both data and several components that are executable by the processor 803. In particular, stored in the memory 806 and executable by the processor 803 are the applications 172, the management service 175, the local security application 178, and potentially other applications. Also stored in the memory 806 may be local data 181 and other data. In addition, an operating system may be stored in the memory 806 and executable by the processor 803.

Referring now to both FIGS. 7 and 8, it is understood that there may be other applications that are stored in the memory 706, 806 and are executable by the processor 703, 803 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 706, 806 and are executable by the processor 703, 803. In this respect, the term "executable" means a program file that is in a form that can ultimately be run by the processor 703, 803. Examples of executable programs may be, for example, a compiled program that can be translated into machine code in a format that can be loaded into a random access portion of the memory 706, 806 and run by the processor 703, 803, source code that may be expressed in proper format such as object code that is capable of being loaded into a random access portion of the memory 706, 806 and executed by the processor 703, 803, or source code that may be interpreted by another executable program to generate instructions in a random access portion of the memory 706, 806 to be executed by the processor 703, 803, etc. An executable program may be stored in any portion or component of the memory 706, 806 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 706, 806 is defined herein as including both volatile and nonvolatile memory and data storage components. Volatile components are those that do not retain data values upon loss of power. Nonvolatile components are those that retain data upon a loss of power. Thus, the memory 706, 806 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 703, 803 may represent multiple processors 703, 803 and the memory 706, 806 may represent multiple memories 706, 806 that operate in parallel processing circuits, respectively. In such a case, the local interface 709, 809 may be an appropriate network that facilitates communication between any two of the multiple processors 703, 803, between any processor 703, 803 and any of the memories 706, 806, or between any two of the memories 706, 806, etc. The local interface 709, 809 may comprise additional systems designed to coordinate this communication, including, for example, performing load balancing. The processor 703, 803 may be of electrical or of some other available construction.

Although the risk profile engine 115, the device information service 118, the user information service 121, the application information service 124, the automated action system 127, the manual review system 130, the applications 172, the management service 175, the local security application 178, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 2-6 show the functionality and operation of an implementation of portions of the risk profile engine 115, the device information service 118, the user information service 121, the application information service 124, and the automated action system 127. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 703, 803 in a computer system or other system. The machine code may be converted from the source code, etc. If embodied in hardware, each block may represent a circuit or a number of interconnected circuits to implement the specified logical function(s).

Although the flowcharts of FIGS. 2-6 show a specific order of execution, it is understood that the order of execution may differ from that which is depicted. For example, the order of execution of two or more blocks may be scrambled relative to the order shown. Also, two or more blocks shown in succession in FIGS. 2-6 may be executed concurrently or with partial concurrence. Further, in some embodiments, one or more of the blocks shown in FIGS. 2-6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the risk profile engine 115, the device information service 118, the user information service 121, the application information service 124, the automated action system 127, the manual review system 130, the applications 172, the management service 175, and the local security application 178, that comprises software or code can be embodied in any non-transitory computer-readable medium for use by or in connection with an instruction execution system such as, for example, a processor 703, 803 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, the program comprising:
    code that identifies a plurality of different software applications installed in a user computing device of a plurality of user computing devices in a networked environment, the user computing device being associated with an end user, the end user having software installation access to the user computing device, the networked environment being associated with an enterprise entity, and the plurality of different software applications being installed on individual ones of the plurality of user computing devices;
    code that identifies a current version of a corresponding software application of the plurality of different software applications based at least in part on version data that includes information about a plurality of versions of the corresponding software application installed on the plurality of user computing devices in the networked environment, the current version being a latest version of the plurality of versions of the corresponding software application that is installed on at least one of the plurality of user computing devices; and
    code that, in response to receiving data indicating respective characteristics for individual ones of the plurality of different software applications, generates respective software application ratings for the individual ones of the plurality of different software applications based at least in part on the respective characteristics and a comparison of the current version of the corresponding software application with a respective installed version of the corresponding software application, wherein at least one of the respective characteristics includes the respective installed version;
    code that, in response to receiving data indicating a relationship of the user computing device to the networked environment and receiving data indicating a relationship of the end user to the enterprise entity, generates respective risk profiles for respective installations of the individual ones of the plurality of different software applications on the user computing device in the networked environment, the respective risk profiles being generated based at least in part on the respective software application ratings, the relationship of the user computing device to the networked environment, and the relationship of the end user associated with the user computing device to the enterprise entity, wherein the data indicating the relationship of the user computing device to the networked environment comprises at least one of whether the user computing device stores protected information, whether the user computing device stores local data, or whether the user computing device hosts at least one unmanaged application; and
    code that performs at least one action in response to at least one of the respective risk profiles meeting at least one predefined criterion.

2. The non-transitory computer-readable medium of claim 1, wherein the at least one action comprises disabling access of the end user to the user computing device.

3. The non-transitory computer-readable medium of claim 1, wherein the at least one action comprises automatically initiating a removal of the respective installation from the user computing device.

4. The non-transitory computer-readable medium of claim 1, wherein the comparison of the current version with the respective installed version is based at least in part on whether a difference between the current version and the respective installed version of the corresponding software application meets a predefined threshold.

5. A system, comprising:
    at least one computing device; and
    at least one application executable in the at least one computing device, the at least one application comprising:
        logic that identifies a plurality of different software applications installed in a networked environment including a plurality of user computing devices, individual ones of the plurality of user computing devices being associated with respective end users;
        logic that identifies a current version of a corresponding software application of the plurality of different software applications based at least in part on version data that includes information about a plurality of versions of the corresponding software application installed on the plurality of user computing devices in the networked environment, the current version being a latest version of the plurality of versions of the corresponding software application that is installed on at least one of the plurality of user computing devices;
        logic that generates respective ratings for individual ones of the plurality of different software applications based at least in part on at least one corresponding characteristic of the individual ones of the plurality of different software applications and a comparison of the current version with a respective installed version associated with the corresponding software application; and
        logic that generates respective risk profiles for the individual ones of the plurality of different software applications installed on the individual ones of the plurality of user computing devices in the networked environment, the respective risk profiles being generated based at least in part on the respective ratings, information associated with corresponding ones of the plurality of user computing devices, corresponding end users associated with the corresponding ones of the plurality of user computing devices, wherein the information associated with the corresponding ones of the plurality of user computing devices comprises at least one of whether corresponding ones of the plurality of user computing devices store protected information, whether the corresponding ones of the plurality of user computing devices store local data, or whether the corresponding ones of the plurality of user computing devices host at least one unmanaged application.

6. The system of claim 5, wherein the respective risk profiles are generated based at least in part on respective job functions of the corresponding end users associated with the corresponding ones of the plurality of user computing devices.

7. The system of claim 5, wherein the respective risk profiles are generated based at least in part on respective background information for the corresponding end users associated with the corresponding ones of the plurality of user computing devices.

8. The system of claim 5, wherein the respective risk profiles are generated based at least in part on respective physical locations of the corresponding ones of the plurality of user computing devices.

9. The system of claim 5, wherein the respective risk profiles are generated based at least in part on respective logical locations of the corresponding ones of the plurality of user computing devices in the networked environment.

10. The system of claim 5, wherein the at least one corresponding characteristic includes a threat classification supplied by a local security application.

11. The system of claim 5, wherein the at least one corresponding characteristic includes whether the corresponding software application communicates over a network.

12. The system of claim 5, wherein the at least one corresponding characteristic includes whether the corresponding software application accesses a protected resource.

13. The system of claim 5, wherein the comparison of the current version with the respective installed version is based at least in part on whether the respective installed version corresponds to the current version.

14. The system of claim 5, wherein the comparison of the current version with the respective installed version is based at least in part on whether a difference between the current version and the respective installed version associated with the corresponding software application meets a predefined threshold.

15. The system of claim 5, wherein the at least one corresponding characteristic includes whether the respective version associated with the corresponding software application corresponds to a disallowed version.

16. The system of claim 5, wherein the at least one application further comprises logic that performs at least one action in response to a particular risk profile meeting at least one predefined criterion.

17. A method, comprising:
  determining, via at least one of one or more computing devices, that an installation of a software application exists in a user computing device of a plurality of user computing devices in a networked environment, wherein at least one end user has access to the user computing device in the networked environment, and wherein the software application is installed on individual ones of the plurality of user computing devices;
  identifying, via at least one of the one or more computing devices, a current version of the software application based at least in part on version data that includes information about a plurality of installed versions of the software application that are installed on the plurality of user computing devices in the networked environment, the current version being a latest version of the plurality of installed versions of the software application that is installed on at least one of the plurality of user computing devices; and
  generating, via at least one of the one or more computing devices, a risk profile for the installation based at least in part on at least one characteristic of the software application, a comparison of the current version of the software application with a respective installed version of the software application installed on the user computing device, data associated with the user computing device on which the installation is installed, and the at least one end user who has access to the user computing device, wherein the data associated with the user computing device comprises at least one of whether the user computing device stores protected information, whether the user computing device stores local data, or whether the user computing device hosts at least one unmanaged application; and
  performing, via at least one of the one or more computing devices, at least one action in response to the risk profile meeting at least one predefined criterion.

18. The method of claim 17, wherein performing the at least one action further comprises limiting, via at least one of the one or more computing devices, a user login capability of the user computing device.

19. The method of claim 17, wherein performing the at least one action further comprises initiating, via at least one of the one or more computing devices, a removal of the software application from the user computing device.

20. The method of claim 17, wherein performing the at least one action further comprises initiating, via at least one of the one or more computing devices, an upgrade of the software application on the user computing device.

21. The method of claim 17, wherein performing the at least one action further comprises initiating, via at least one of the one or more computing devices, a display of information by the user computing device.

22. The method of claim 17, wherein performing the at least one action further comprises submitting, by at least one of the one or more computing devices, a review task for the risk profile to a manual review system.

23. The method of claim 17, wherein the at least one action further comprises limiting, via at least one of the one or more computing devices, access to the networked environment for the at least one end user who has access to the user computing device.

* * * * *

UNITED STATES PATENT AND TRADEMARK OFFICE
CERTIFICATE OF CORRECTION

| | | |
|---|---|---|
| PATENT NO. | : 8,925,092 B1 | Page 1 of 1 |
| APPLICATION NO. | : 13/414929 | |
| DATED | : December 30, 2014 | |
| INVENTOR(S) | : Jesper M. Johansson et al. | |

It is certified that error appears in the above-identified patent and that said Letters Patent is hereby corrected as shown below:

In the claims,

Column 13, line 47: remove "and"

Column 16, line 12: remove "and"

Signed and Sealed this
Sixteenth Day of February, 2016

Michelle K. Lee
*Director of the United States Patent and Trademark Office*